(12) United States Patent
Butrimavicius et al.

(10) Patent No.: US 12,296,949 B2
(45) Date of Patent: May 13, 2025

(54) LOAD DECOUPLE FOR FOLDING WING

(71) Applicant: Goodrich Actuation Systems Limited, Solihull (GB)

(72) Inventors: Karolis Butrimavicius, Wolverhampton (GB); Paul Smith, Broseley (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 292 days.

(21) Appl. No.: 17/829,852

(22) Filed: Jun. 1, 2022

(65) Prior Publication Data

US 2022/0402591 A1 Dec. 22, 2022

(30) Foreign Application Priority Data

Jun. 18, 2021 (EP) .................................... 21275086

(51) Int. Cl.
*B64C 3/56* (2006.01)

(52) U.S. Cl.
CPC ..................................... *B64C 3/56* (2013.01)

(58) Field of Classification Search
CPC ... B64C 3/56; F16H 25/2015; F16H 25/2021; F16H 25/24; E05D 11/1014; E05D 11/1078
USPC .................................................. 16/352, 353
See application file for complete search history.

(56) References Cited

U.S. PATENT DOCUMENTS

| | | | | | |
|---|---|---|---|---|---|
| 4,215,587 A | * | 8/1980 | Kisovec | ...................... | B64C 1/30 74/89.14 |
| 4,564,974 A | * | 1/1986 | McGrail | ............. | E05D 11/1007 16/349 |
| 4,566,150 A | * | 1/1986 | Boothe | ...................... | E06C 1/32 16/349 |
| 5,201,479 A | * | 4/1993 | Renzelmann | ............. | B64C 3/56 D12/345 |
| 5,310,138 A | * | 5/1994 | Fitzgibbon | ................ | B64C 3/56 244/49 |

(Continued)

FOREIGN PATENT DOCUMENTS

| | | |
|---|---|---|
| EP | 2184512 A1 | 5/2010 |
| EP | 2604514 A2 | 6/2013 |
| EP | 3357808 A1 | 8/2018 |
| EP | 3360779 A | 8/2018 |

(Continued)

OTHER PUBLICATIONS

European Search Report for Application No. 21275086.3, mailed Dec. 13, 2021, 7 pages.

*Primary Examiner* — Jeffrey O'Brien
(74) *Attorney, Agent, or Firm* — CANTOR COLBURN LLP

(57) ABSTRACT

A locking pin system comprising: an actuator having an actuator body defining an axial bore along its length; a locking pin axially moveably mounted within the bore, and drive means for driving the locking pin axially along the bore between a locking position extending from the actuator body and an unlocking position relatively retracted into the actuator body; wherein the drive means comprises engagement means for releasably engaging the locking pin, the engagement means being biased to an open position where they are not in engagement with the locking pin, and wherein the bore comprises a first section having a first diameter and a second section having a second, wider diameter.

8 Claims, 2 Drawing Sheets

(56) References Cited

U.S. PATENT DOCUMENTS

| | | | | |
|---|---|---|---|---|
| 5,381,986 | A * | 1/1995 | Smith | B64C 3/56 244/49 |
| 5,426,819 | A * | 6/1995 | Rohn | E05C 17/025 16/353 |
| 6,032,418 | A * | 3/2000 | Larson | B64C 3/56 74/483 R |
| 6,591,453 | B2 * | 7/2003 | Jenks | E05D 11/1007 16/329 |
| 8,191,440 | B2 * | 6/2012 | Hadley | F16H 25/2454 74/89.34 |
| 10,808,808 | B2 * | 10/2020 | Crine | F16B 13/068 |
| 11,192,629 | B2 * | 12/2021 | Brakes | B64U 30/12 |
| 11,396,933 | B2 * | 7/2022 | Hors | B64C 25/26 |
| 2014/0259532 | A1 * | 9/2014 | Millard | E05D 11/1028 16/326 |
| 2019/0389559 | A1 * | 12/2019 | Lorenz | B64C 3/56 |

FOREIGN PATENT DOCUMENTS

| | | |
|---|---|---|
| WO | 2006007713 A1 | 1/2006 |
| WO | 2020260394 A1 | 12/2020 |

* cited by examiner

LOAD DECOUPLE FOR FOLDING WING

CROSS REFERENCE TO RELATED APPLICATIONS

This application claims priority to European Patent Application No. 21275086.3 filed Jun. 18, 2021, the entire contents of which is incorporated herein by reference.

TECHNICAL FIELD

The present disclosure relates to a locking system for locking two relatively foldable panels together in an opened out or extended state such as, but not only, for use in a folding wing system of an aircraft.

BACKGROUND

There are applications where two parts e.g. panels are foldable relative to each other via a hinge arrangement and there is a need to lock then connected parts in their opened out configuration. This may be done by driving a locking pin or bolt between the two cooperating parts of the hinge by an actuator.

Some aircraft are designed to have wings with folding portions e.g. folding tips. Generally, larger aircraft, with larger wing spans, that can carry more passengers are more fuel efficient. Further, aerodynamic drag is generally reduced the longer the aircraft wings are, and, so, the more efficient the aircraft is in flight. Long wing spans, however, can present problems on the ground, for example where airport space e.g. at the gate or on the taxiway, is limited. Foldable wing systems have therefore been developed. The wings can be extended to their full span for flight, but the wing tips can be folded up (or down) relative to the fixed portion of the wing when space is limited, Locking or latching systems secure the wing tip in its extended position relative to the fixed wing part during flight. Such latching systems usually include a locking pin that is pushed through intermeshing lugs on the foldable and fixed wing parts by means of an actuator. The wing parts are usually assembled such that spaced apart lugs along the edge of the foldable wing part that meets the fixed wing part fit between spaced apart lugs along the matching edge of the fixed wing part. The interlocking lugs together define a hinge passage through which a locking pin is pushed by an actuator when the wings parts are to be locked in the extended position. Different types of actuator may be used e.g. hydraulic, electromechanical or electrical actuators are used in aircraft to control moveable parts.

During flight, high loads act on the aircraft wings and are transferred to the pin through the hinge joining the wing parts. There will usually be some free play between the pin and the holes in the lugs that the pin passes through. Due to the loads, the pin can deform and move radially and axially while in the locked position. The forces on the pin will be transferred to the actuator connected to the pin. This is undesirable as it could damage the actuator. Particularly in aircraft and other safety-critical applications, actuators need to be designed to be able to withstand the maximum anticipated forces and so often actuators will be oversized and overdesigned because of the forces that might be transferred from the locking pin. This can also be an issue in other locking systems, and is not only a problem in aircraft wing systems.

Also, it is necessary to be able to detach the pin from the actuator for maintenance purposes.

There is, therefore, a need for an improved locking assembly for securing two relatively pivotal parts when the pin is in the latched position.

SUMMARY

Accordingly, there is provided a locking assembly comprising a locking pin system comprising: an actuator having an actuator body defining an axial bore along its length, a locking pin axially moveably mounted within the bore, and drive means for driving the locking pin axially along the bore between a locking position extending from the actuator body and an unlocking position relatively retracted into the actuator body; wherein the drive means comprises engagement means (800) for releasably engaging the locking pin, the engagement means being biased to an open position where they are not in engagement with the locking pin, and wherein the bore comprises a first section having a first diameter and a second section having a second, wider diameter, and wherein the bore and the engagement means are configured such that when the engagement means are located in the first section, the actuator body forces the engagement means to a closed position to engage with the locking pin and when the engagement means are in the second section, they return to the open position and out of engagement with the locking pin.

The drive means may move in a direction to move the locking pin from the unlocking position to the locking position, the engagement means move from the first section to the second section such that the engagement means are open when the locking pin is in the locking position, and as the drive means moves in an opposite direction towards the locking position, the engagement means move from the second section to the first section to close and engage the locking pin.

In an example, the engagement means comprise a plurality of resilient tines and the locking pin has a circumferential groove with which the tines engage in the closed position.

In an example, the drive means comprises a nut mounted on a screw arranged to move along the screw in an axial direction between the locking and unlocking directions.

Also disclosed is a foldable system, such as a foldable wing system of an aircraft, comprising two relatively foldable parts each having hinge lugs wherein the hinge lugs of one part intermesh with the hinge lugs of the other part to form a hinge to define the relative pivotal movement between the parts, and a locking pin system of any preceding claim, the hinge defining a locking pin passage therethrough to receive the locking pin of the locking pin system to lock the parts with respect to each other in a given pivotal relationship.

In an example, one of the parts is a stationary part and the other is a moveable part foldable relative to the stationary part.

Also disclosed is a method of locking and unlocking two relatively foldable parts comprising driving a locking pin through a hinge connecting the two parts, whereby the locking pin is driven to a locking position by means of a drive means that engages with the locking pin to drive the pin to the locking position, the method further comprising disengaging the drive means from the locking pin when the locking pin is in the locking position.

The method may further comprise re-engaging the drive means with the locking pin to withdraw the locking pin to an unlocking position.

In the example, when moving to the locking position, the drive means passes through a first bore having a dimension which presses engagement means of the drive means into engagement with the locking pin and then into a second bore of greater diameter than the first bore such that the engagement means are released from engagement with the locking pin.

BRIEF DESCRIPTION

The assembly according to the disclosure will be described in the context of foldable aircraft wings. This is by way of example only and it should be understood that the assembly will also be useful in other systems.

Examples will be described with reference to the drawings.

DETAILED DESCRIPTION

Figure 1:
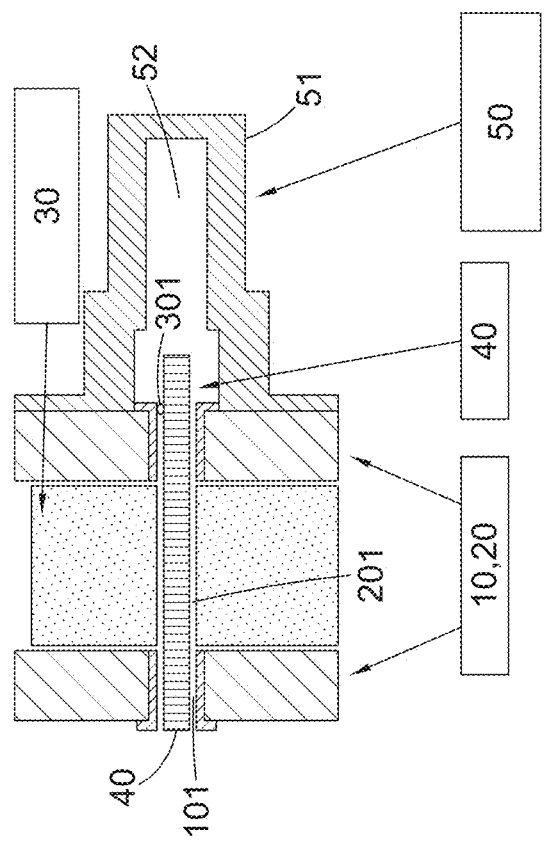
FIG. 1 shows a conventional locking system in an unloaded state.

FIG. 1 shows the hinged connection between a foldable part e.g. a wing tip and a fixed part e.g. the wing body. Along their adjoining edges, the two wing parts have a plurality of lugs 10, 20, 30 that intermesh to form the join between the moveable part and the fixed part. FIG. 1 shows a section of the join, showing two lugs 10, 20 that are attached to the fixed part of the wing and one lug 30 of the movable part. The lug of the movable part is fitted between the adjacent lugs 10,20 of the fixed part. This alternate intermeshing of lugs from the fixed part and lugs from the movable part continues along the length of the hinge between the parts. Each lug is provided with a hole 101, 201, 301 through the lug, the holes being such that when the lugs are intermeshed as described above, the holes align to form a passage for a locking pin 40. The locking pin 40 is attached to an actuator 50 arranged to drive the pin 40 through the holes of the lugs to lock the parts in a relative pivotal position relative to each other e.g. in the extended state or to withdraw the pin 40 from the holes to release the parts for relative folding movement. The actuator 50 has an actuator body 51 defining a bore 52 to house the pin when in the unlocked state.

Figure 2:
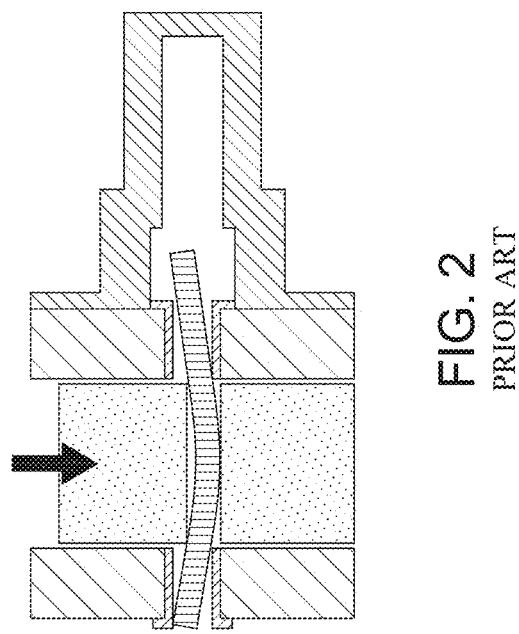
FIG. 2 shows the conventional system in a loaded state.

FIGS. 1 and 2 both show the arrangement when the pin 40 is in the locking position. In FIG. 1, no excess forces or loads are acting on the join between the parts and so the locking pin is unloaded. If the parts are, however, subjected to high loads or forces, the pin 40 can move within the passage and/or can be impacted by the lugs moving relative to each other as shown in FIG. 2. The end of the locking pin 40 that is in engagement with the actuator will thus be caused to move and can transmit loads to the actuator. This can cause damage to the actuator. To account for such loads, as mentioned above, actuators often need to be oversized or overdesigned for reasons of reliability and safety.

Figure 4:
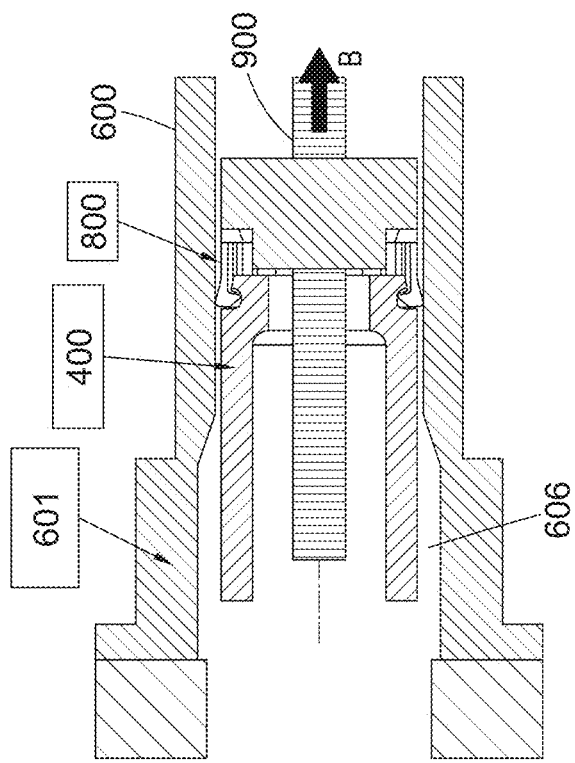
FIG. 4 shows the assembly of FIG. 3 transitioning to an unlocked position.
Figure 3:
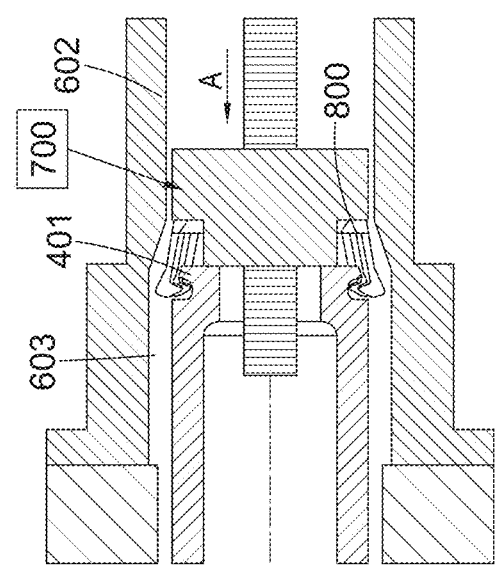
FIG. 3 shows an assembly according to the disclosure in a locked position.

FIGS. 3 and 4 show a locking system according to this disclosure, where the locking pin and actuator are configured such that the pin is decoupled from the actuator when in the locking position. In this way, loads on the pin are not transferred to the actuator.

In the system according to the disclosure, the locking system comprises a locking pin 400 that is configured, as in the conventional arrangement described above, to be driven through the passage defined by the holes in the intermeshing lugs of relatively pivotal parts. The intermeshing lugs are not shown in FIGS. 3 and 4 as these are the same as described above. These are, therefore, represented by a simple aircraft structure 500 in these figures. As with conventional systems, the pin 400 is driven into and out of the lugs by means of an actuator 600. The actuator has an actuator body 601 which has an internal profile defining a first diameter section 602 and a second, wider diameter section 603. Thus, the actuator bore 606 along which the locking pin travels has a narrower section and a wider section.

The locking pin 400 is caused to move along the bore 606 by means of a nut 700 that engages with an end 401 of the pin inside the actuator body. The nut 700 is driven by the actuator mechanism to cause movement of the locking pin 400 in the desired direction. The nut is preferably a threaded nut mounted onto a screw 900 to push the locking pin into position by travelling on the rotating screw 900.

The nut is provided with radially expandable engagement features e.g. tines 800 that engage with the end 401 of the locking pin. The engagement tines are biased in the open position and will therefore return to the open or disengaged position when not pressed into engagement by an external force e.g. the force of the actuator bore wall. In the example shown, the locking pin may be provided with one or more grooves or recesses within which the tines can engage. Other means for providing engagement between the nut and the locking pin are also envisaged.

To bring the pin 400 into the locking position, it needs to be extended out of the bore of the actuator. The nut 700 is therefore driven in the direction of arrow A through the actuator bore along the narrower first section 602. The nut and the engagement tines are configured, and the bore is dimensioned, such that while the end of the pin and the nut are located in the narrower section of the bore, the inner walls of the actuator body defining the bore press the tines into engagement with the pin. As the nut moves in direction A it pushes the locking pin into the locking position. As the end 401 of the locking pin moves into the wider section 603 of the actuator bore, the pressing force of the actuator wall pushing the tines into engagement with the pin is removed and the tines are allowed to expand away from engagement with the pin as shown in FIG. 3. The locking pin is therefore decoupled from the actuator. If the pin becomes loaded as shown in e.g. FIG. 2, the loading is not transferred to the actuator.

To then retract the pin to the unlocking position where the pin is withdrawn into the actuator bore, the nut 700 is drawn in the direction of arrow B which causes the engagement tines 800 to be pressed by the narrower diameter of the actuator inner wall and to re-engage with the locking pin. The tines 800 thus hook onto the end of the pin allowing the pin to be pulled by the nut back into the actuator body.

This arrangement has the advantage that the pin, when in the locking position, is decoupled from the actuator, but can be re-attached to the actuator for movement to the unlocking position.

To completely remove the locking pin, e.g. for maintenance or exchange, the nut and locking pin are further withdrawn from the actuator bore allowing the tines to fully open and release the pin.

The actuator design is relatively simple, small and light. Because the pin will be decoupled from the actuator in the locked position which is when the high loads can act on the pin, it is not necessary to design the actuator to withstand such loads. On the other hand, though, the locking pin can be easily removed for e.g. maintenance or exchange.

The invention claimed is:

1. A locking pin system comprising:
an actuator having an actuator body defining an axial bore along its length;
a locking pin axially moveably mounted within the bore; and
drive means for driving the locking pin axially along the bore between a locking position extending from the actuator body and an unlocking position relatively retracted into the actuator body, the drive means comprising:
engagement means for releasably engaging the locking pin, the engagement means being biased to an open position where they are not in engagement with the locking pin;
wherein the bore comprises a first section having a first diameter and a second section having a second, wider diameter; and
wherein the bore and the engagement means are configured such that when the engagement means are located in the first section, the actuator body forces the engagement means to a closed position to engage with the locking pin and when the engagement means are in the second section, they return to the open position and out of engagement with the locking pin.

2. The system of claim 1, configured such that as the drive means moves in a direction to move the locking pin from the unlocking position to the locking position, the engagement means move from the first section to the second section such that the engagement means are open when the locking pin is in the locking position, and as the drive means moves in an opposite direction towards the locking position, the engagement means move from the second section to the first section to close and engage the locking pin.

3. The system of claim 1, wherein the engagement means comprise a plurality of resilient tines and wherein the locking pin has a circumferential groove with which the tines engage in the closed position.

4. The system of claim 1, wherein the drive means comprises a nut mounted on a screw arranged to move along the screw in an axial direction between the locking and unlocking directions.

5. A foldable system comprising:
two relatively foldable parts each having hinge lugs;
wherein the hinge lugs of one part intermesh with the hinge lugs of the other part to form a hinge to define the relative pivotal movement between the parts; and
a locking pin system of claim 1, the hinge defining a locking pin passage therethrough to receive the locking pin of the locking pin system to lock the parts with respect to each other in a given pivotal relationship.

6. The foldable system of claim 5, wherein one of the parts is a stationary part and the other is a moveable part foldable relative to the stationary part.

7. The foldable system of claim 5, wherein the two foldable parts are part of a foldable wing system wherein one of the two parts is a fixed wing part and an other of the two parts is a foldable wing tip.

8. The foldable system of claim 7, wherein the system is a foldable wing system of an aircraft.

* * * * *